(12) United States Patent
Woerlee et al.

(10) Patent No.: US 7,218,603 B2
(45) Date of Patent: May 15, 2007

(54) OPTICAL DATA STORAGE MEDIUM AND USE OF SUCH MEDIUM

(75) Inventors: Pierre Hermanus Woerlee, Eindhoven (NL); Wilhelmus Robert Koppers, Eindhoven (NL); Ruud Vlutters, Eindhoven (NL); Bin Yin, Eindhoven (NL); Ronald Reindert Drenten, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 363 days.

(21) Appl. No.: 10/515,683

(22) PCT Filed: May 14, 2003

(86) PCT No.: PCT/IB03/01980

§ 371 (c)(1),
(2), (4) Date: Nov. 24, 2004

(87) PCT Pub. No.: WO03/100774

PCT Pub. Date: Dec. 4, 2003

(65) Prior Publication Data

US 2006/0072430 A1     Apr. 6, 2006

(30) Foreign Application Priority Data

May 27, 2002   (EP)   ................... 02077089

(51) Int. Cl.
  *G11B 7/24*   (2006.01)
(52) U.S. Cl. ................... 369/283; 369/288; 369/275.1; 428/64.4
(58) Field of Classification Search ............. 369/272.1, 369/275, 277, 280, 283, 47.22, 286, 288, 369/59.25, 53.2, 100, 13.35, 59.11, 59.12, 369/47.51; 428/64.1–64.5
See application file for complete search history.

(56) References Cited

U.S. PATENT DOCUMENTS 5,614,938 A    3/1997   Sugiyama et al.

(Continued)

FOREIGN PATENT DOCUMENTS

| WO | WO 9959143 | 11/1999 |
| WO | WO 0028532 | 5/2000 |

OTHER PUBLICATIONS

T. Akiyama et al; "Rewritable Dual-Layer Phase-Change Ooptical Disk Utilizing A Blue-Violet Laser", 10th Intern. Syimposium on Optical Memory 2000K, Hokkaido Japan, Nov. 5-8, 2000; vol. 40, No. 3B, pp. 1598-1603; XP002250250, no date.

(Continued)

*Primary Examiner*—Ali Neyzari

(57) ABSTRACT

A multi-stack optical data storage medium (20) for rewritable recording using a focused radiation beam (30), entering through an entrance face (25) is described. The medium (20) has a substrate (1a, 1b) and an L0 recording stack (2) and an L1 recording stack (3) both comprising a phase-change type L0 and L1 recording layer and the recording stacks are separated by a transparent spacer layer (4). The L0 recording stack (2) is present at a position closest to the entrance face (25) and has an optical transmission of $TL0a$ and $TL0c$ when the phase-change layer respectively is in the amorphous phase and in the crystalline phase. The medium (20) contains pre-recorded information modulated in at least one of: an embossed pregroove (21) in the substrate (1a, 1b), embossed pits in the substrate and recorded phase-change marks in at least one of the recording layers L0 and L1 (6, 11). The pre-recorded information contains a flag whether formatting of the L0 recording layer of the L0 recording stack (2) is needed depending on the transmission values $TL0a$ and $TL0c$ of the L0 recording stack (2). In this way it is achieved that the medium (20) has a good playability, recordability and random access behavior even when the L0 recording layer (2) has been partially recorded with information.

10 Claims, 7 Drawing Sheets

U.S. PATENT DOCUMENTS 5,726,969 A 3/1998 Moriya et al.
6,723,410 B2 * 4/2004 Ohno et al. ................ 428/64.1
6,861,117 B2 * 3/2005 Rijpers et al. ............. 428/64.1

OTHER PUBLICATIONS

A. Mijiritskii et al.; "Development of Recording Stacks for a Rewritable Dual-Layer Optical Disc", Japanese Journal of Applied Physics, Part 1; Mar. 2002; Japan Soc. Appl. Phys, Japan; vol. 41, No. 3B, pp. 1668-1673, XP002250251, no date.

K. Nagata et al; "Rewritable Dual-Layer Phase-Change Ooptical Disk", Japanese Journal of Applied Physics, Tokyo, Japan; vol. 38, No. 3B, Mar. 1999; pp. 1679-1686. XP000905979, no date.

* cited by examiner

OPTICAL DATA STORAGE MEDIUM AND USE OF SUCH MEDIUM

The invention relates to a multi-stack optical data storage medium for rewritable recording using a focused radiation beam entering through an entrance face of the medium during recording, comprising:

a substrate with present on a side thereof:

an $L_0$ recording stack comprising a phase-change type $L_0$ recording layer, said first recording stack being present at a position closest to the entrance face and having an optical transmission of $T_{L0a}$ when the phase-change layer is in the amorphous phase, and having an optical transmission of $T_{L0c}$ when the phase-change layer is in the crystalline phase, an $L_1$ recording stack, comprising a phase-change type $L_1$ recording layer, being present more remote from the entrance face than the $L_0$ recording stack, a transparent spacer layer between the recording stacks, said transparent spacer layer having a thickness substantially larger than the depth of focus of the focused laser-light beam, the medium further comprising pre-recorded information.

The invention further relates to the use of such a medium.

An embodiment of an optical storage medium of the type mentioned in the opening paragraph is known from United States patent U.S. Pat. No. 5,726,969. Rewritable optical storage for audio, video and data applications is a rapidly growing market. For Digital Versatile Disk ReWritable (DVD+RW) the storage capacity is 4.7 Gbyte. This is a limited amount of storage for video recording. With MPEG2 compression it is possible to record 1 hour of high quality digital video and 2 hours of standard quality. More recording time is desirable. An option is to use optical disks with multiple information layers (see FIG. 1). Such disks are already available for DVD read only (DVD-ROM). DVD rewritable dual-recording stack disks are proposed in said known patent. The $L_0$ stack (i.e. the stack closest to the laser) has a transmission around 50%. The stacks are separated by a spacer layer with a typical thickness between 30 and 60 um. The $L_1$ stack (stack farthest from the laser) has a high reflection and needs to be very sensitive. The effective reflection of both stacks is typically 7% although lower and higher values are possible e.g. 3%–18%.

The recording layers of said stacks are of the phase-change type. An optical data storage medium based on the phase-change principle is attractive, because it combines the possibilities of direct overwrite (DOW) and high storage density with easy compatibility with read-only optical data storage systems. Data storage, in this context, includes digital video-, digital audio- and software-data storage. Phase-change optical recording involves the formation of submicrometer-sized amorphous recording marks in a crystalline recording layer using a focused relatively high power radiation beam, e.g. a focused laser-light beam. During recording of information, the medium is moved with respect to the focused laser-light beam that is modulated in accordance with the information to be recorded. Marks are formed when the high power laser-light beam melts the crystalline recording layer. When the laser-light beam is switched off and/or subsequently moved relatively to the recording layer, quenching of the molten marks takes place in the recording layer, leaving an amorphous information mark in the exposed areas of the recording layer that remains crystalline in the unexposed areas. Erasure of written amorphous marks is realized by recrystallization through heating with the same laser at a lower power level, without melting the recording layer. The amorphous marks represent the data bits, which can be read, e.g. via the substrate, by a relatively low-power focused laser-light beam. Reflection differences of the amorphous marks with respect to the crystalline recording layer bring about a modulated laser-light beam which is subsequently converted by a detector into a modulated photo current in accordance with the recorded information.

An important issue for multi-stack rewritable disks is random access. When a disk is recorded for the first time the $L_0$ recording layer of the $L_0$ stack, closest to the entrance face of the laser, is partially written. Since the transmission of written and unwritten parts is different, reading and writing of the $L_1$ recording layer may be influenced (see FIG. 2). Of special interest is the impact on the data signal, tracking and focussing signals. It is known that an optical disk drive can cope with relatively small differences in transmission e.g. fingerprints, dust, etc. When the transmission differences exceed certain values the playability of the disk is strongly degraded. In severe cases the disk will not be usable anymore. Two known solutions are possible. In the first solution the $L_0$ recording layer is pre-formatted or fully written before recording of the $L_1$ recording layer. This procedure is not desirable because it is time consuming for the user and not ideal for systems which require random access. It should be avoided if possible. The second solution is to optimize the optical data storage medium such that the transmission difference between written and unwritten parts is very small (less than 1%). This is called balanced transmission for which at a 405 nm radiation beam wavelength good results have been reported by K Narumi (ISOM 2001). For wavelengths around 650 nm it is very difficult to achieve a balanced transmission. A disadvantage of the medium approach is that it limits the choice of phase-change materials which can be used. This can be a drawback for high-speed recording. The optical properties of materials suitable for high-speed recording at wavelengths around 650 nm are such that balanced transmission is not feasible for realistic stacks designs.

It is likely that rewritable dual-recording stack disks will be introduced in the market. Presently in the DVD forum there are discussions to use dual stack disks for high-definition TV recording. It is probable that in the near future disks with substantial transmission differences between written and unwritten parts of the $L_0$ layer will be used. It is a problem that substantial differences in transmission will occur in a partially written $L_0$ recording layer which may degrade the playability, recordability and/or random access option of the disk.

It is an object of the invention to provide an optical data storage medium of the type mentioned in the opening paragraph which has a good playability, recordability and random access behavior even when the $L_0$ recording layer has been partially recorded with user data.

This object is achieved with the optical data storage medium according to the invention which is characterized in that the pre-recorded information contains a flag whether pre-formatting of the $L_0$ recording layer of the $L_0$ recording stack is needed depending on the transmission values $T_{L0a}$ and $T_{L0c}$ of the $L_0$ stack.

It was found that when the optical transmissions of the user data written portion and the unwritten portion of the $L_0$ recording stack are within certain boundaries pre-formatting is not required. Normally, when the transmission difference between a written portion of user data and unwritten portion is too large pre-formatting, before recording user data, is the only option for leveling this transmission difference. In the latter case, without pre-formatting, e.g. the servo signals may be disturbed too much for successfully and randomly reading and recording of a further portion of the recording layers of the medium. In order to select between the option of yes/no pre-formatting, a pre-recorded dual-stack disk should contain information whether pre-formatting of the $L_0$ recording layer is needed or not depending on the mentioned transmission differences. Thus pre-formatting of the $L_0$ recording layer before user data recording is an option, the necessity of it is pre-recorded in the medium by e.g. the manufacturer. The pre-recorded information is modulated in at least one of: an embossed pregroove in the substrate, embossed pits in the substrate and recorded phase-change marks in at least one of the recording layers $L_0$ and $L_1$. The option is added as an additional flag, e.g. one or more bits, in the pre-recorded information using e.g. available ADdress In Pregroove (ADIP) words or other pre-recording info physically present on the disk e.g. embossed pits in case another disk format is used e.g. DVD-RW. ADIP is a method of modulating data in the pregroove or guide track of an optical data storage medium. The modulation is achieved by wobbling the pregroove. The information may also be pre-recorded in the recording layer of the medium e.g. the phase-change recording layer, preferably in an area, e.g. the lead-in/lead out area or disk identification area, where it does not or hardly disturb the recording of data by the end user. The advantage of the additional flag is that it remains possible to use a wide range of materials with larger transmission differences. When applicable, the $L_0$ recording layer of the medium preferably is (partially) pre-formatted or recorded prior to recording of recording layer $L_1$.

In a preferred embodiment $0.40 < T_{L0a} < 0.60$ and $0.40 < T_{L0c} < 0.60$. When the transmissions of the written and unwritten portions of the $L_0$ recording stack are within these boundaries pre-formatting is not needed. In this range of transmissions the playability, recordability and random access are still acceptable. Simulations and measurements show that the transmission of crystalline and amorphous phase change stacks may vary between 40% and 60% before degradation in the tracking and other relevant signals occurs. This makes it possible to use a wide class of phase-change materials for the $L_0$ layer.

It is advantageous when a semi-transparent metal reflective layer is present in the $L_0$ stack with a thickness smaller than 15 nm. At this thickness the metal still has a substantial optical transparency which is required because the focused radiation beam must also reach the $L_1$ layer. It is favorable when the metal mainly comprises one of Ag and Cu. These two metals have the additional advantage that they have a relatively large thermal conduction at a relatively low thickness which is favorable for the optical transmission.

In another embodiment the $L_0$ and $L_1$ stacks respectively have effective optical reflection values $R_{L0}$ and $R_{L1}$, which are substantially equal. This has the advantage that the modulated signals when information is read back with a focused radiation beam are well balanced. In practice $R_{L0}$ and $R_{L1}$ have a value between 0.03 and 0.18, typically both 0.07. The recording layers comprise at least three elements selected from the group of the elements Ge, In, Sb and Te. Alloys of these materials have shown to be suitable for high data rates which requires high-speed recording. High-speed recording in its turn requires the phase change material to have a small complete crystallization time (CET).

In a special embodiment an additional recording stack L2 is present separated from the $L_1$ stack by a transparent spacer layer having a thickness larger than the depth of focus of the focused laser-light beam. In this case three recording stacks are present which enhances the data capacity with approximately another 50%.

Embodiments of the optical storage medium according to the invention and measurement results will be elucidated in greater detail with reference to the accompanying drawings, in which FIG. 1 shows a schematic cross-sectional view of an embodiment of the optical data storage medium according to the invention including an $L_0$- and an L1-stack. The dimensions are not drawn to scale;

Figure 4A:
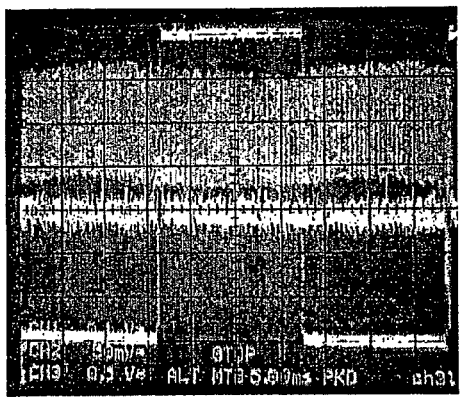
Figure 4B:
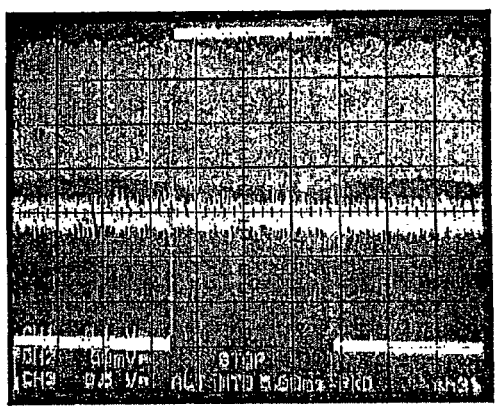
Figure 4C:
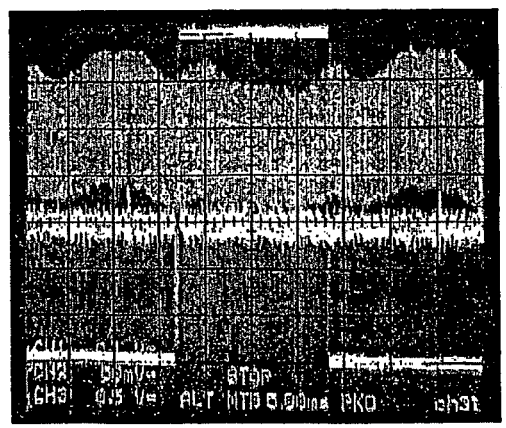
Figure 5:
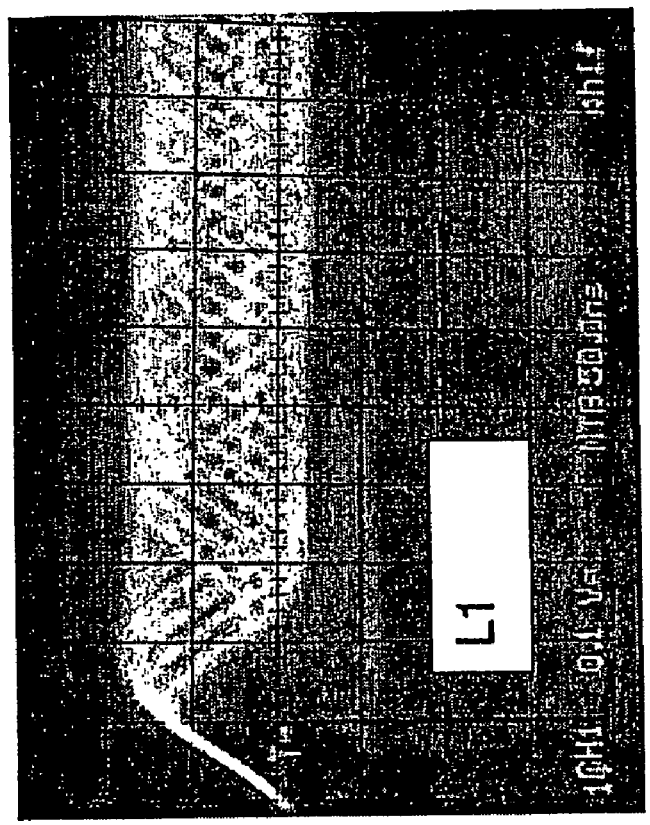
Figure 5:
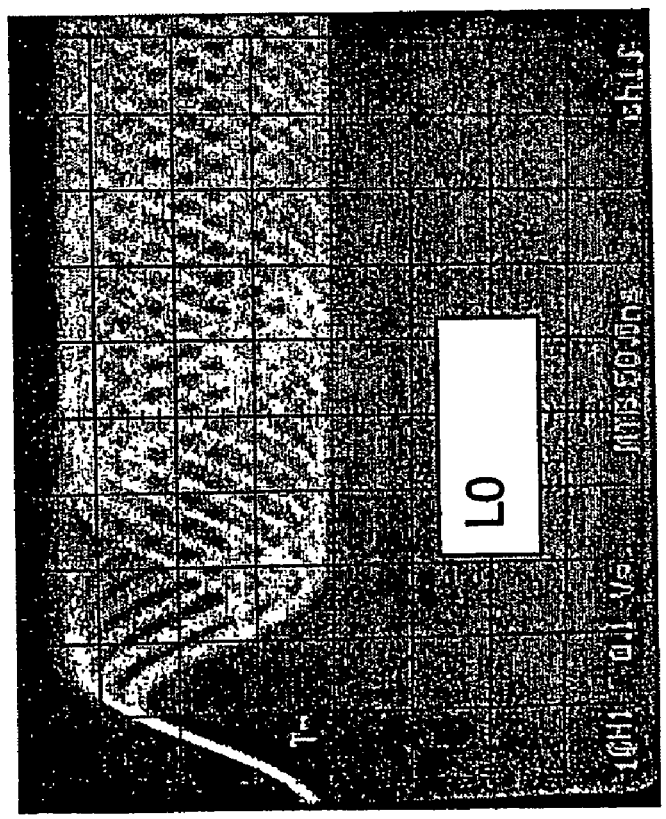
Figure 6:
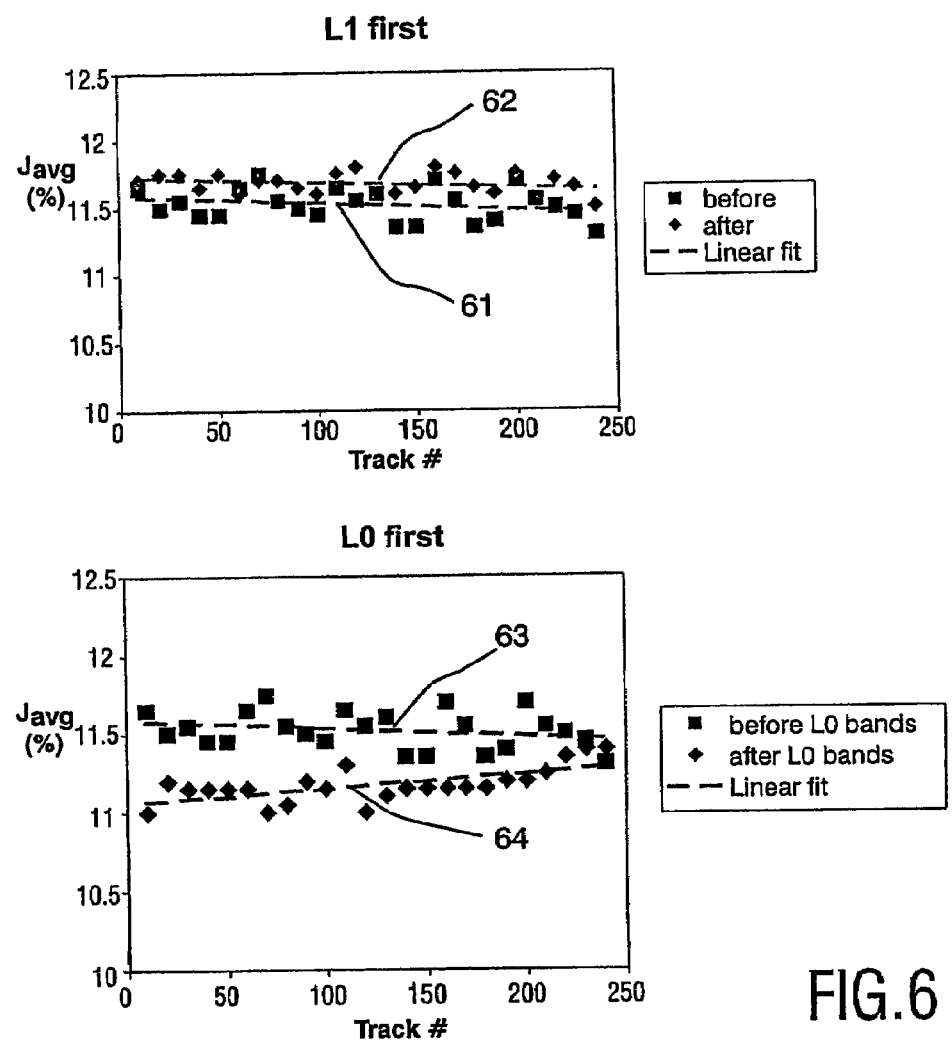

FIGS. 4a, 4b and 4c shows the HF signal taken from an optical disk drive when reading out the LI layer when a) Lo is empty, b) $L_0$ is fully written, c) $L_0$ partially written FIG. 5 shows eye patterns of data read from respectively $L_0$ and $L_1$ recording layers of DL disk FIG. 6 shows the average jitter (in %) of data read from $L_1$ recording layer of disk with either $L_0$ layer written after or before $L_1$ writing.

Figure 7:
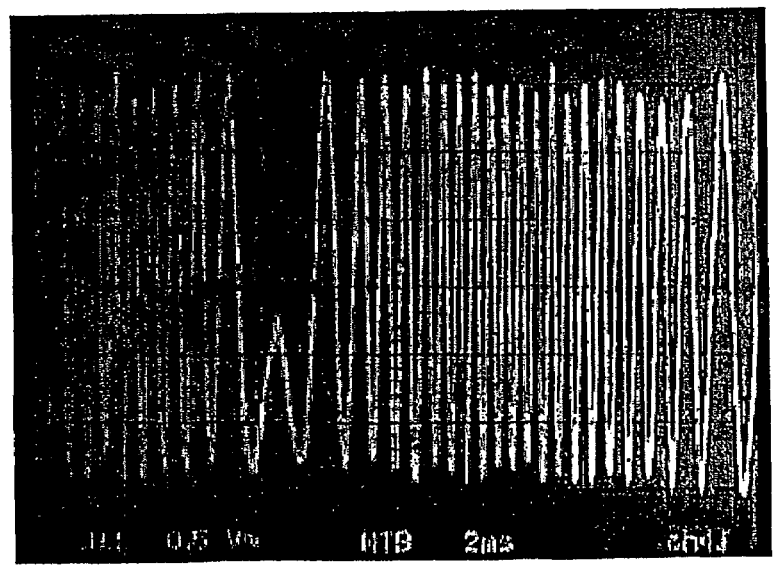

FIG. 7 shows the open loop push-pull-tracking signal of the $L_1$ recording layer with a partially written $L_0$ recording layer.

Figure 8:
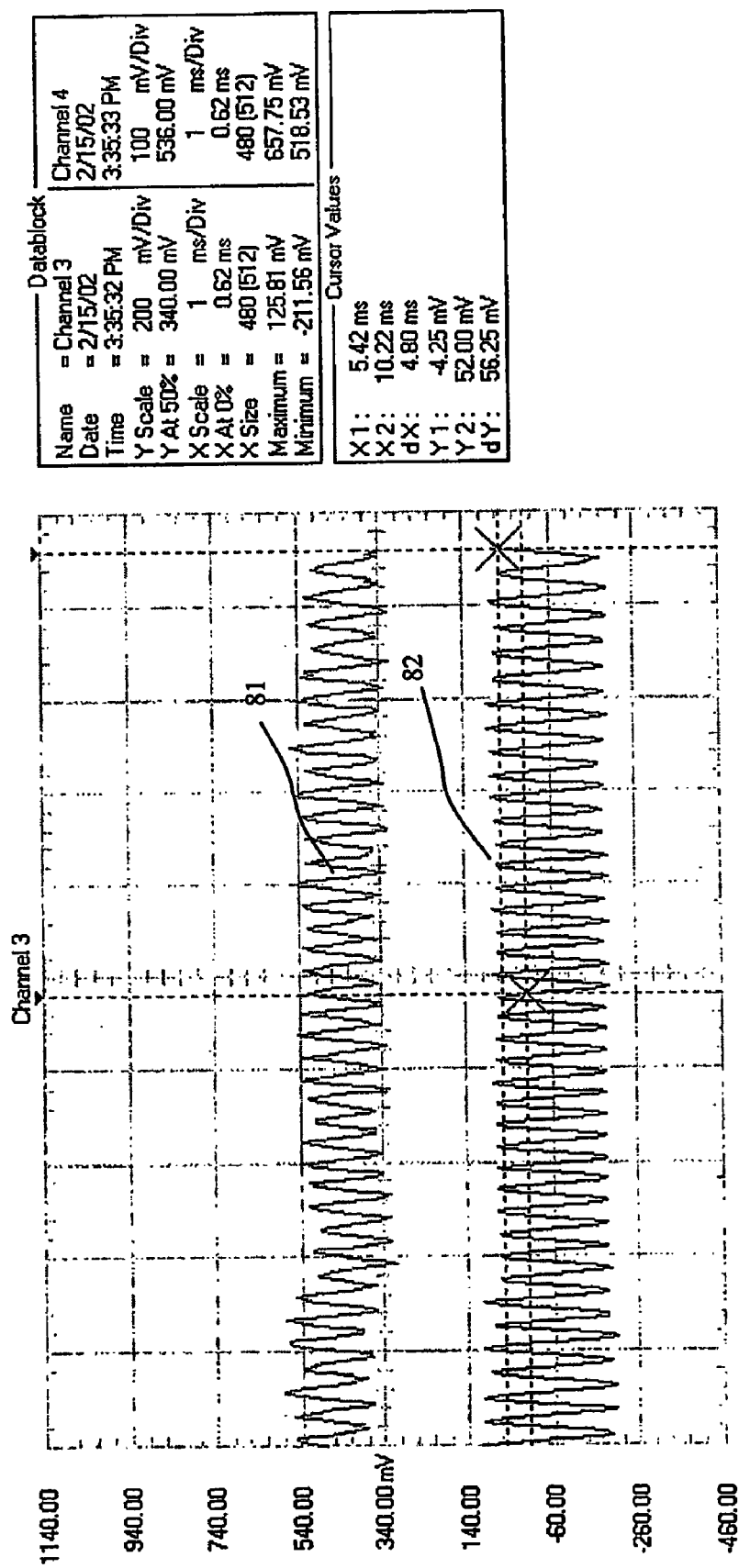

FIG. 8 shows the low frequency filtered central aperture (CA) signal and 3-spots push-pull signal of an $L_1$ ROM layer of dual layer disk. The $L_0$ recording layer is partially written (half-track band).

Figure 9:
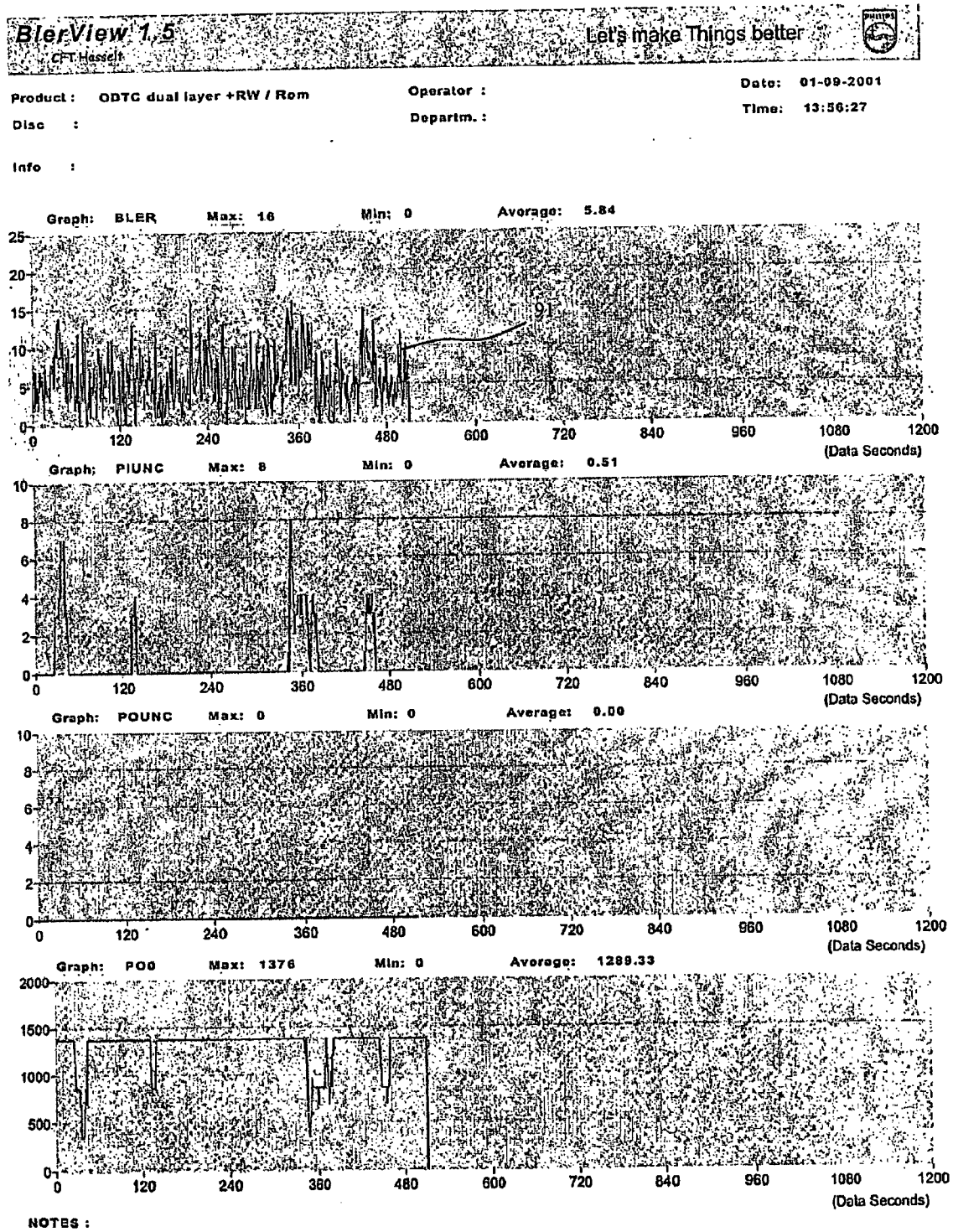

FIG. 9 shows, inter alia, Block Error Rate (BLER) data of $L_1$ layer of dual layer RW/ROM disk.

Figure 10:
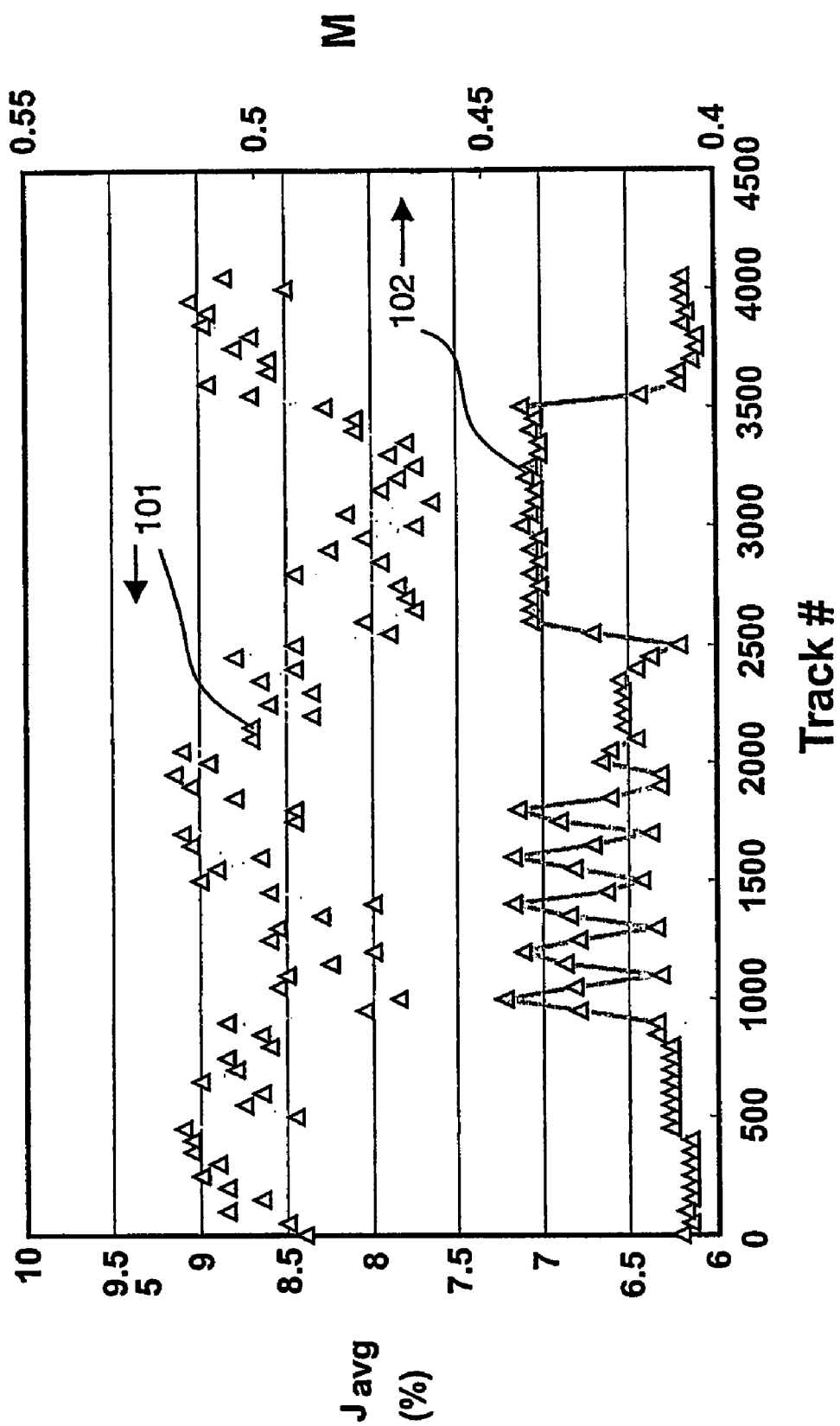

FIG. 10 shows the average jitter $J_{avg}$ (in %) and modulation M of data read from the $L_1$ recording layer of a dual stack disk at different track positions when $L_0$ layer is partially written (note that $L_1$ is written after partially writing $L_0$)

Figure 1:
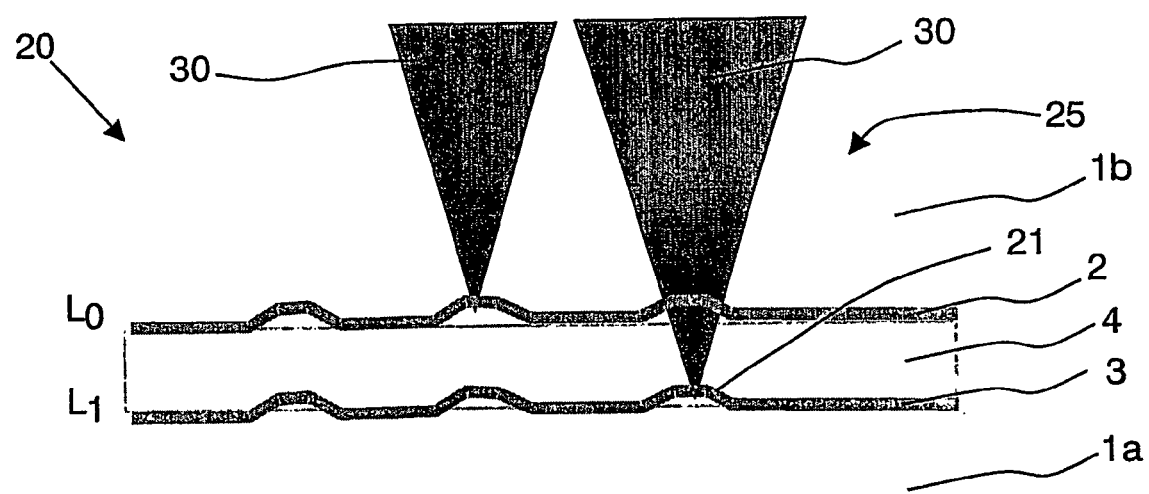
Figure 2:
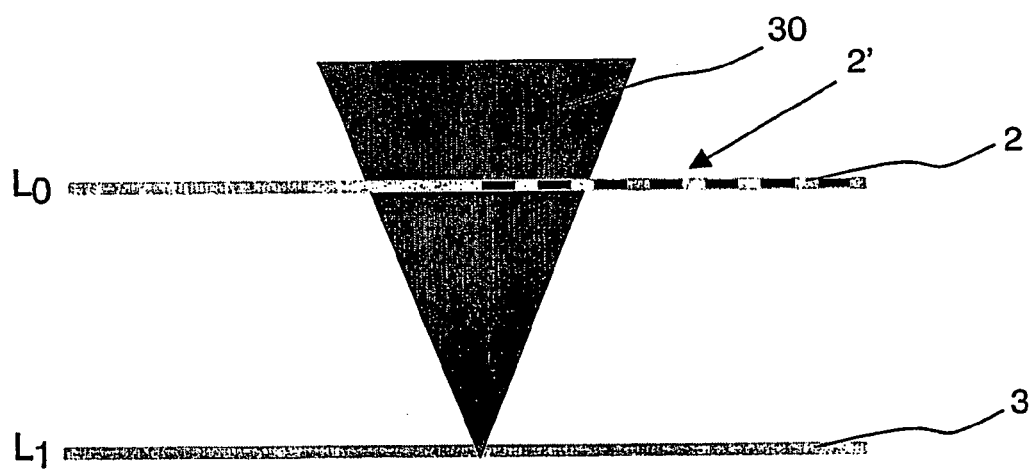
FIG. 2 shows a schematic cross-sectional view of the medium of FIG. 1 in which the $L_0$ recording layer has been partially written.
Figure 3:
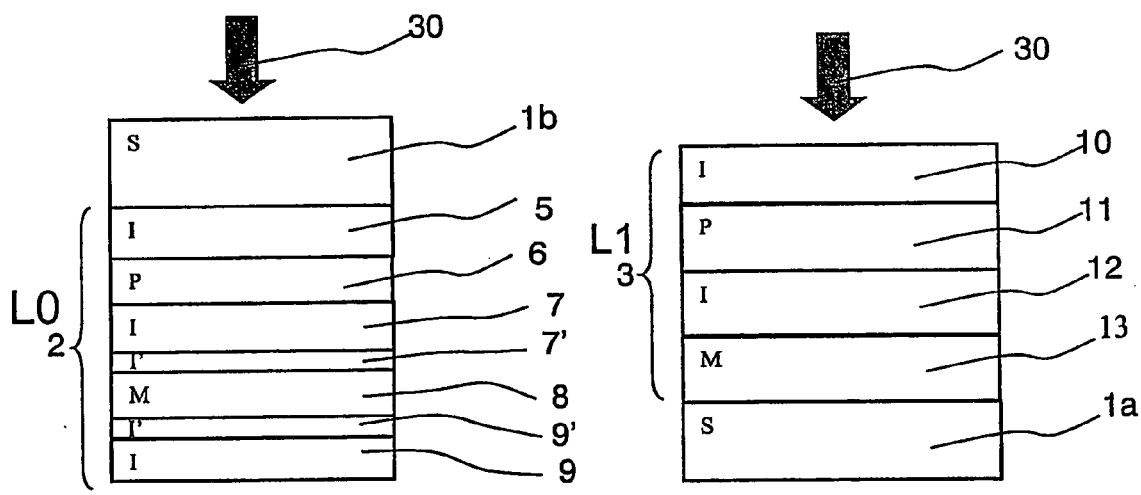
FIG. 3 shows in more detail the stack design of the $L_0$ and the $L_1$ stack of an embodiment of the optical data storage medium according to the invention.

In FIGS. 1, 2 and 3 a schematic cross-section of a multi-stack optical data storage medium 20 for rewritable recording using a focused radiation beam 30 entering through an entrance face 25 of the medium 20 during recording is shown. The medium 20 comprises a substrate 1a, 1b with present on a side thereof an $L_0$ recording stack 2 comprising a phase-change type $L_0$ recording layer. The $L_0$ recording stack 2 is present at a position closest to the entrance face 25 and has an optical transmission of $T_{L0a}$ when the phase-change layer 6 is in the amorphous phase and of $T_{L0c}$ when the phase-change layer 6 is in the crystalline phase. An $L_1$ recording stack 3 with a phase-change type $L_1$ recording layer 11 is present more remote from the entrance face 25 than the $L_0$ recording stack 2. A transparent spacer layer 4 is present between the recording stacks and has a thickness of 52 µm, which is larger than the depth of focus of the focused laser-light beam 30. The transparent spacer layer 4 is made of a UV-light curable resin known in the art and may be applied by spincoating or as a sheet of transparent plastic with pressure sensitive adhesive (PSA). The medium 20 contains pre-recorded information modulated in an embossed pregroove 21 in the substrate by means of Address In Pregroove (ADIP). The modulation is achieved by wobbling the pre-groove 21, which is a known technique. The pre-recorded information contains a flag whether formatting of the $L_0$ recording layer 6 of the $L_0$ recording stack 2 is needed depending on the transmission values $T_{L0a}$ and $T_{L0c}$ of the $L_0$ stack 2.

In FIG. 2 the $L_0$ recording stack 2 is shown which has been partially recorded or written with data 2' while the focused laser beam 30 focuses onto the $L_1$ recording stack 3.

In FIG. 3 two parts of a dual stack DVD+RW disk comprising a semi-transparent part with $L_0$ stack, called $L_0$, a spacer layer and a part with an $L_1$ stack, called L1, are shown. The $L_0$ part comprises a polycarbonate (PC) substrate 1b of 0.58 mm thickness with DVD+RW pregroove structure, not drawn in this Figure, having a groove depth of about 30 nm and ADIP info is used. The $L_0$ layer stack present on the substrate 1b comprises a first dielectric $(ZnS)_{80}(SiO_2)_{20}$ layer 5, a 6 nm thick phase change layer 6, which comprises at least three elements selected from the group of the elements Ge, In, Sb and Te, a second $(ZnS)_{80}(SiO_2)_{20}$ layer 7, a 3 nm $Si_3N_4$ capping layer 7', a thin semi transparent metal alloy heat-sink and reflective layer 8 of 10 nm mainly comprising Ag, a second silicon nitride capping layer 9' and a third $(ZnS)_{80}(SiO_2)_{20}$ layer 9. All layers are deposited by sputtering. The $L_0$ stack is a so-called IPI'MI'I stack, in which notation I represents a dielectric layer, I' a capping layer, P a phase-change recording layer and M a metal layer. On the substrate 1a of the $L_1$ part a thick metal reflective and heat sink layer 13 being a 50 nm Al alloy, a first $(ZnS)_{80}(SiO_2)_{20}$ layer 12, a 12 nm phase change layer 11 and a second $(ZnS)_{80}(SiO_2)_{20}$ layer 10 are deposited by sputtering. The $L_1$ stack is an IPIM stack, in which I, P and M have the already mentioned meaning. After initialization, i.e. crystallization, of the $L_0$ and the $L_1$ recording layers 6 and 11 the $L_0$ part and $L_1$ part are bonded together separated by a transparent spacer 4 with a thickness between 25–60 μm, here 52 μm. The $L_0$ and $L_1$ stacks 2 and 3 respectively are designed such that they have effective optical reflection values $R_{L0}$ and $R_{L1}$ which are substantially equal and having a value of 7% each. The transmission $T_{L0c}$ of the unrecorded crystalline $L_0$ recording stack 2 is 40%, the transmission of the recorded (amorphous) $L_0$ stack 2 $T_{L0a}$ is 52%. The effective transmission of a recorded part is close to 43%, i.e. ¼ of area is mark. Thus for the transmission of the written area of the $L_0$ stack 2 a transmission equal to $(3T_{L0c}+T_{L0a})/4$ was assumed. An additional recording stack L2, not shown, may be present separated from the $L_1$ stack by a transparent spacer layer having a thickness substantially larger than the depth of focus of the focused laser-light beam. In this case the transmission levels of the $L_0$ and $L_1$ stacks have to be adjusted in order to balance effective reflection values form the $L_0$, $L_1$ and L2 stacks.

In FIG. 4 the HF read out signal of the $L_1$ recording layer 6 from a dual stack disk is shown for three cases. In 4a the trace with $L_0$ unwritten is shown, in 4b with $L_0$ written and in 4c for a partially written $L_0$ layer, i.e. bands of 70 pregroove tracks written/unwritten. Clearly in the HF signal some effect of the written tracks in the $L_0$ layer can be seen. Recording results in the form of eye patterns are shown in FIG. 5 for the $L_0$ and $L_1$ recording layers.

In FIG. 6 Direct Overwrite (10 DOW cycles) average jitter $J_{avg}$ is around 11% for the $L_1$ recording layer 6, which is represented by graphs 61 to 64. $J_{avg}$ levels of the $L_1$ recording layer 11 of below 9% may also be achieved, which is shown in FIG. 10. Jitter of the $L_0$ recording layer is around 9%. The average jitter value of the $L_1$ recording layer 2 is slightly affected by the status of $L_0$ recording layer 2. Two experiments are shown. In the first experiment the $L_1$ recording layer is written first and afterwards $L_0$, in this way the read effects are studied because $L_1$ writing is always the same independently from the $L_0$ pattern. Graph 61 represents a linear fit of jitter data before $L_0$ is written and 62 after $L_0$ is written. In the second experiment $L_0$ is written first and afterwards L1, in this way both the influence of a partially written $L_0$ disk on the writing and the reading is simulated. Graph 63 represents a linear fit of jitter data before $L_0$ is written and 64 after $L_0$ is written. The latter method ($L_0$ first) is also used in FIG. 10.

FIG. 7 shows the open loop push-pull-tracking signal of the $L_1$ recording layer with partially written $L_0$ recording layer. The open loop signal is the tracking signal when the laser is not tracking on a pregroove, i.e. the tracking servo is not activated. No substantial disturbance is visible in the signal.

In FIG. 8 it is shown that normalized push pull and central aperture (CA) signals 82 and 81 were not severely degraded. In order to test the influence of a partially written $L_0$ recording layer on the bit error rate data rate of the $L_1$ layer a dual layer disk with a read only ROM $L_1$ layer was fabricated. The ROM disk data consisted of a video stream (ECC correct data). The reflection of the ROM disk was comparable with that of the previous $L_1$ layer. As a test pattern a band of half-tracks was written in $L_0$, in which case only a 180-degree portion of the full rotation of several adjacent tracks is recorded. This is considered as the worst case pattern for bit errors. The 3-spot push pull signal 82 of the ROM layer is shown where the focused laser beam crosses an $L_0$ written/unwritten transition. The normalized signal is affected slightly, but no substantial offset can be observed. Tracking is without problem but note that the push-pull signal 82 is small because of the use of the ROM disk as $L_1$ disk. The block error rate (BLER) was low, all blocks could be corrected and no effect of the partially written $L_0$ recording layer is observed even for this worst case situation, which is shown in FIG. 9 in curve 91. Other measured parameters in FIG. 9 are not considered relevant at this time.

The impact of a partially written $L_0$ recording layer 6 was investigated by modeling of the push-pull signal. The calculation results are shown in Table 1 as a function of the transmission $T_{L0a}$ and $T_{L0c}$. The position of the focused laser beam 30 is such that half of the beam passes a written area. For the transmission of the written area a transmission equal to $(3T_c+T_a)/4$ was again assumed. Clearly for $0.40<T_{L0a}<0.60$ and $0.40<T_{L0c}<0.60$ the offset in the push pull signal is small (<2 nm) and significantly smaller than the allowed 16 nm which is the maximum allowed value according to the DVR+RW format specification book version 1.1.

Hence both experimental results and simulations show that for a realistic range of transmission values $T_{L0a}$ and $T_{L0c}$ of 0.40 to 0.60 the influence of writing information in the $L_0$ recording layer 6 on the tracking and read-out system is substantially absent

TABLE 1

Calculated push-pull offset (in nm) for variable transmission differences of written and empty tracks. The position of the focused laser beam is such that half of the beam 30 passes a written area.

| | $T_{L0c}$ | | |
|---|---|---|---|
| $T_{L0a}$ | 0.4 | 0.5 | 0.6 |
| 0.4 | 0.0 nm | 0.78 nm | 1.33 nm |
| 0.5 | −0.93 nm | 0.0 nm | 0.65 nm |
| 0.6 | −1.8 nm | −0.75 nm | 0.0 nm |

In FIG. 10 the influence of a non-written or written $L_0$ recording layer 6, when the $L_1$ recording layer 11 is written through the partially written $L_0$ recording layer 6, on the average jitter $J_{avg}$ of an $L_1$ recording layer of DVD+RW Dual Stack disk is shown. At positions where the $L_0$ recording layer has been written the $J_{avg}$ decreases about 0.5%. Variation in $J_{avg}$ along the disk is about 0.5%. The pattern written in the L0 recording layer consisted of 5 times 100 tracks EFM+alternated with 100 empty (non-written) tracks, 500 tracks $L_0$ EFM data (a half-circular pattern is written as described with FIG. 8), 100 empty tracks and 1000 tracks of EFM+$L_0$. This pattern is clearly visible in the modulation (M) curve 102. In areas where the $L_0$ recording layer is written the $J_{avg}$ decreases because the transmission of the $L_0$ stack is about higher, i.e. about 10% relatively. This causes an increased laser recording power in the $L_1$ recording layer which in its turn causes the modulation to increase and the $J_{avg}$ to drop, which is clearly visible in curve 101.

It should be noted that the above-mentioned embodiments and experimental data illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention, a multi-stack optical data storage medium for rewritable recording using a focused radiation beam, entering through an entrance face is described. The medium has a substrate and an $L_0$ recording stack and an $L_1$ recording stack both comprising a phase-change type $L_0$ and $L_1$ recording layer and the recording stacks are separated by a transparent spacer layer. The $L_0$ recording stack is present at a position closest to the entrance face and has an optical transmission of $T_{L0a}$ and $T_{L0c}$ when the phase-change layer respectively is in the amorphous phase and in the crystalline phase. The medium contains pre-recorded information modulated in at least one of: an embossed pregroove in the substrate, embossed pits in the substrate and recorded phase-change marks in at least one of the recording layers $L_0$ and $L_1$. The pre-recorded information contains a flag whether formatting of the $L_0$ recording layer of the $L_0$ recording stack is needed depending on the transmission values $T_{L0a}$ and $T_{L0c}$ of the $L_0$ recording stack. In this way it is achieved that the medium has a good playability, recordability and random access behavior even when the $L_0$ recording layer has been partially recorded with information.

The invention claimed is:

1. A multi-stack optical data storage medium for rewritable recording using a focused radiation beam entering through an entrance face of the medium during recording, comprising:
   a substrate with present on a side thereof:
   an $L_0$ recording stack comprising a phase-change type $L_0$ recording layer, said first recording stack being present at a position closest to the entrance face and having an optical transmission of $T_{L0a}$ when the phase-change layer is in the amorphous phase, and having an optical transmission of $T_{L0c}$ when the phase-change layer is in the crystalline phase,
   an $L_1$ recording stack, comprising a phase-change type $L_1$ recording layer, being present more remote from the entrance face than the $L_0$ recording stack,
   a transparent spacer layer between the recording stacks, said transparent spacer layer having a thickness substantially larger than the depth of focus of the focused laser-light beam, the medium further comprising pre-recorded information, characterized in that the pre-recorded information contains a flag whether formatting of the $L_0$ recording layer of the $L_0$ recording stack is needed depending on the transmission values $T_{L0a}$ and $T_{L0c}$ Of the $L_0$ stack.

2. An optical data storage medium as claimed in claim 1, wherein the pre-recorded information is modulated in at least one of: an embossed pregroove in the substrate, embossed pits in the substrate and recorded phase-change marks in at least one of the recording layers $L_0$ and $L_1$.

3. An optical data storage medium as claimed in claim 1, wherein $0.40<T_{L0a}<0.60$ and $0.40<T_{L0c}<0.60$.

4. An optical data storage medium as claimed in claim 1, wherein a semi-transparent metal reflective layer is present in the $L_0$ stack with a thickness smaller than 15 nm.

5. An optical data storage medium as claimed in claim 4, wherein the metal mainly comprises one of the elements Ag and Cu.

6. An optical data storage medium as claimed in claim 1, wherein the $L_0$ and $L_1$ stacks respectively have effective optical reflection values $R_{L0}$ and $R_{L1}$ which are substantially equal.

7. An optical data storage medium as claimed in claim 6, wherein $R_{L0}$ and $R_{L1}$ have a value between 0.03 and 0.18.

8. An optical data storage medium as claimed in claim 1, wherein the recording layers comprise at least three elements selected from the group of the elements Ge, In, Sb and Te.

9. An optical data storage medium as claimed in claim 1, wherein an additional recording stack L2 is present separated from the $L_1$ stack by a transparent spacer layer having a thickness larger than the depth of focus of the focused laser-light beam.

10. Use of an optical data storage medium according to claim 1 for multi-stack and random access rewritable data recording.

* * * * *